United States Patent [19]
Pletcher

[11] 3,991,013
[45] Nov. 9, 1976

[54] COPOLYESTERS OF DERIVATIVES OF HYDROQUINONE

[75] Inventor: Terry Carl Pletcher, Hockessin, Del.

[73] Assignee: E. I. Du Pont de Nemours and Company, Wilmington, Del.

[22] Filed: July 16, 1975

[21] Appl. No.: 596,235

Related U.S. Application Data

[63] Continuation-in-part of Ser. No. 468,695, May 10, 1974, abandoned.

[30] Foreign Application Priority Data

Apr. 29, 1975 Sweden .............................. 7504996

[52] U.S. Cl. ........................... 260/47 C; 57/140 R; 260/32.8 R; 264/176 F; 428/480
[51] Int. Cl.² .................. C08G 63/18; C08G 63/66
[58] Field of Search .................................. 260/47 C

[56] References Cited

UNITED STATES PATENTS

| | | | |
|---|---|---|---|
| 3,160,603 | 12/1964 | Holub et al. | 260/47 |
| 3,160,605 | 12/1964 | Kantor et al. | 260/47 |
| 3,225,003 | 12/1965 | Macon | 260/47 |
| 3,704,279 | 11/1972 | Ismail | 260/61 |
| 3,780,148 | 12/1973 | Jackson, Jr. et al. | 264/141 |

*Primary Examiner*—Lester L. Lee

[57] ABSTRACT

This invention relates to a class of novel copolyesters derived from derivatives of hydroquinone and a mixture of ethylenedioxy-4,4'-dibenzoic acid with terephthalic, bibenzoic, hexahydroterephthalic acids or 2,6-naphthalenedicarboxylic acid and to the fibers and other shaped articles prepared therefrom. Also comprehended by this invention are the novel, optically anisotropic copolyester melts from which these shaped articles can be prepared.

11 Claims, 1 Drawing Figure

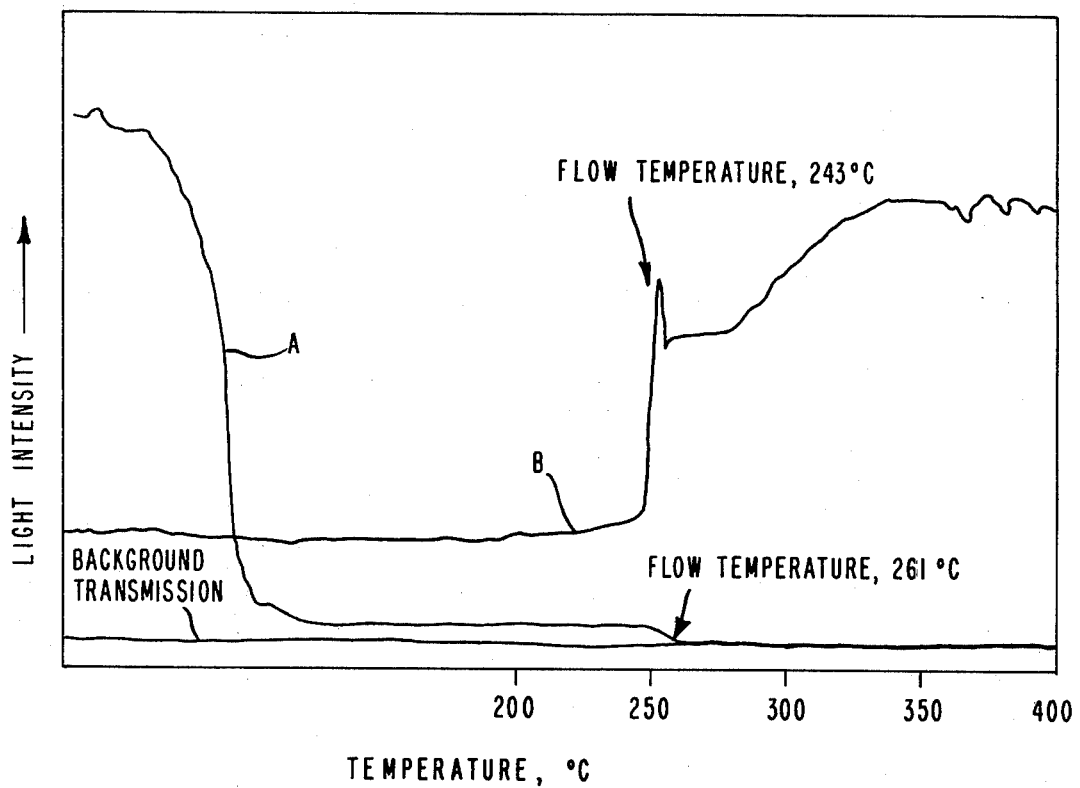

COPOLYESTERS OF DERIVATIVES OF HYDROQUINONE

CROSS REFERENCE TO RELATED APPLICATION

This application is a continuation-in-part of my application Ser. No. 468,695, filed May 10, 1974, and now abandoned.

BACKGROUND OF THE INVENTION

While numerous other polyesters have been prepared and evaluated, polyethylene terephthalate continues to be the singularly preferred polyester in current commercial use. This species is used to prepare a variety of products including films, textile filaments, tire cords, ropes, and other industrial and consumer products. The development of new polyesters having one or more properties superior to polyethylene terephthalate has been a worthwhile objective.

SUMMARY OF THE INVENTION

This invention provides novel, anisotropic-melt-forming copolyesters of fiber-forming molecular weight consisting essentially of units of the formulas:

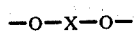 (I)

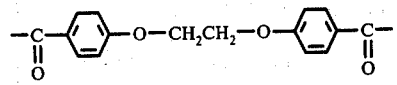 (II)

and

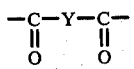 (III)

where X is selected from the group of chloro-, bromo-, methyl- and dimethyl-1,4-phenylene radicals; up to 80 mol % of the formula I units may be replaced with

units; Y is selected from the group of 1,4-phenylene, 1,4-cyclohexylene, 4,4'-biphenylene, and 2,6-naphthylene radicals; and the mol ratio of formula II to formula III units is from 1:4 to 4:1. Formula I units and their replacement and the combined formula II and III units are present in substantially equimolar amounts.

Also comprehended by this invention are optically anisotropic melts, novel shaped articles of the copolyesters and methods for preparing such shaped articles. Especially preferred are high strength fibers which are characterized by a desirable combination of properties including hydrolytic stability and in-rubber stability. These fibers are characterized by high as-spun tenacity, orientation and initial modulus ( ≥ 200 gpd), and high modulus retention at elevated temperatures, e.g., 150° C. Certain heat-treating processes enhance the properties of the fibers.

DRAWING

The FIGURE depicts light intensity traces obtained as described herein for two different polyesters in the solid and melt states along with the background trace. One of the trace curves is of a polyester yielding an anisotropic melt while the other trace curve is of a polymer which yields an isotropic melt.

DESCRIPTION OF THE PREFERRED EMBODIMENTS

Polyesters

The novel polyesters of this invention may be prepared from appropriate dicarboxylic acids and dihydric phenols or their derivatives.

Useful Monomers

Dihydric phenols which may be used for preparing the copolyesters of this invention include 2-chlorohydroquinone, 2-bromohydroquinone, 2-methylhydroquinone and 2,6-dimethylhydroquinone. Phenolic reactants are used preferably in the derivative form such as the corresponding diacetates. Useful acids are terephthalic acid, 2,6-naphthalenedicarboxylic acid, bibenzoic acid, hexahydroterephthalic acid, and ethylenedioxy-4,4'-dibenzoic acid.

The preferred copolyester according to this invention is poly(chloro-1,4-phenylene terephthalate/ethylenedioxy-4,4'dibenzoate)(70/30 mol basis). Other useful polyesters according to this invention include copoly(bromo-1,4-phenylene ethylenedioxy-4,4'-dibenzoate/terephthalate) (20/80), copoly(methyl-1,4-phenylene ethylenedioxy-4,4'-dibenzoate/hexahydroterephthalate)(50/50), copoly(methyl-1,4-phenylene ethylenedioxy-4,4'-dibenzoate/4,4'-bibenzoate) (80/20), copoly(1,4-phenylene/bromo-1,4-phenylene ethylenedioxy-4,4'-dibenzoate/hexahydroterephthalate) (50/50 – 50/50), copoly(2,6-dimethyl-1,4-phenylene ethylenedioxy-4,4'-dibenzoate/terephthalate)(70/30) and copoly(chloro-1,4-phenylene ethylenedioxy-4,4'-dibenzoate/2,6-naphthalate)(70/30).

The copolyesters of this invention have a molecular weight sufficient for them to exhibit fiber-forming properties. In the case of soluble polymers, inherent viscosities of at least 0.5, measured as described hereinafter, are useful for shaped articles.

With polymers that are insoluble in the solvent used for determining inherent viscosity, the fiber-forming potential may be demonstrated by melting a chip of polymer in the anisotropic melt-forming temperature range on a heated bar (e.g., a modified Dennis bar, see Sorenson, W. and Campbell, T. W. "Preparative Methods of Polymer Chemistry", Interscience Publishers, Inc., New York, 1961, p. 49–50), and slowly (~1 ft/sec) withdrawing fibers from the melted pool.

Polymerization Conditions

The novel polyesters of this invention may be prepared from appropriate monomers by melt polymerization techniques, preferably under anhydrous conditions in an inert atmosphere. For example, equimolar amounts of the reactant acids and the diacetate(s) of the dihydric phenol(s) are combined in a reaction vessel equipped with a stirrer, nitrogen inlet tube, and combined distillation head-condenser (to facilitate by-product removal). The reaction vessel and other equipment are dried and purged with nitrogen prior to use. The vessel and stirred contents, maintained under nitrogen, are heated during which time the reactants polymerize and the by-product (acetic acid) is removed via the distillation head-condenser and is collected. When the polymerization appears nearly complete. as indicated by the amount of acetic acid collected remaining constant, the molten polymer mass is placed under reduced pressure (e.g., 1 mm. Hg or less) and is heated, under nitrogen, at a higher temperature to facilitate removal of the remaining acetic acid and to complete the polymerization. The melt may then be removed, cooled, and allowed to solidify prior to purification and/or subsequent processing. Optionally, the molten polymer may be transferred directly to an appropriate apparatus for preparation of shaped articles, e.g., a spinning unit for fiber preparation.

For smaller scale polyester syntheses, e.g., in a polymer melt tube, stirring action may be performed by a stream of inert gas passing through the molten polymerization mixture. However, mechanical stirring is preferred.

Polymerization conditions (e.g., temperature, duration of heating, pressures, etc.) may be varied according to, e.g., the reactants employed and the degree of polymerization desired.

Anisotropic Melts

The anisotropy of these copolyesters in the molten state facilitates attainment of high orientation, strength, high initial modulus, and/or low shrinkage in as-spun fibers prepared from the melts, and contributes to the capacity of these fibers to increase in tenacity on heat treatment in an essentially relaxed state. The melts are believed to comprise domains of parallel aligned polymer chains which in the spinning process produce as-spun oriented fibers.

Optical anisotropy of the copolyester melts can be determined by modification of known procedures. It is well known that translucent optically anisotropic materials cause light to be transmitted in optical systems equipped with crossed polarizers [see, e.g., S. A. Jabarin and R. S. Stein, J. Phys. Chem., 77, 399 (1973)], whereas transmission of light is theoretically zero for isotropic materials. Thus, optical anisotropy can be determined by placing a sample of the polymer on a heating stage of a polarizing microscope and bringing the temperature up to and beyond the polymer flow temperature. If the polymer is optically anisotropic in the melt, a bright field will be observed at temperatures above the polymer flow temperature. This may be confirmed through use of the thermooptical test (TOT) described below. The apparatus is similar to that described by I. Kirshenbaum, R. B. Isaacson, and W. C. Feist, Polymer Letters, 2, 897–901 (1964).

Shaped Article Preparation

The copolyesters of this invention are formed into useful shaped articles such as fibers, films, bars, or other molded objects, etc. by, e.g., pressing or by spinning, casting, or extruding the anisotropic melts thereof. Especially preferred are the highly oriented, strong fibers. For fiber preparation the molten polymer mass, obtained either directly from the melt polymerization of the copolymer-forming ingredients or via the melting of a plug or block of copolymer, is processed, e.g., through a melt spinning unit and extruded through a spinneret into a quenching atmosphere (e.g., air maintained at room temperature) and wound up. As used herein, the term "as-spun fiber" refers to a fiber which has not been drawn, stretched, or heat treated after extrusion and normal windup. In fact, the "as-spun" fibers of the anisotropic melts cannot be drawn in the usual sense, i.e., 100% or more.

Fibers may be prepared conveniently from single or multi-hole spinnerets. In the melt spinning cell, the temperatures to be maintained in the melt zone and at the spinneret will vary, of course, depending on the polymer being spun. Filtering screens and discs may be employed in the spinneret pack. Air or nitrogen may be used as a quenching medium for the fibers leaving the spinneret. The as-spun fibers may be wound up at varying speeds, e.g., from less than 100 yd/min to 1,750 yd/min or higher. Spin stretch factor (SSF, defined hereinafter) varies with spinneret hole size and may range from 5 to 400. If desired, a finish may be applied to the as-spun fibers.

Films and stiff, tough bars may be prepared by conventional techniques. The relatively low viscosity of the melts is of advantage in processing. Thus, a bar of copoly(chloro-1,4-phenylene ethylenedioxy-4,4'-dibenzoate/terephthalate)(70/30), (insoluble in sym-dichlorotetrafluoroacetone hydrate), injection molded at 290° C, exhibits an average flexural modulus of 1,450,000 lb/in$^2$, flexural strength of 22,400 lb/in$^2$ (ASTM-D-790, Method 1, Proc. A) and notched Izod impact strength (ASTM-D-256, Method A) of 5.4 ft-lb/inch of notch. A uniform, creasable film (thickness = 8.27 mils) of the same composition pressed at 290° C/5,500 lb/in$^2$/15 sec. exhibits a modulus = 355 × 10$^3$ lb/in$^2$, an elongation at break = 1.6%, and a breaking strength = 4.4 × 10$^3$ lb/in$^2$ (Method of U.S. Pat. No. 3,627,579).

It is preferred that the polyesters have a flow temperature within the range of 200° to 375° C. Polyesters with flow temperatures in excess of 375° C are difficult to process (e.g., spin into useful fibers). Depending on structure, rapid decomposition of the polyesters may occur at higher temperatures, i.e., above 375° C.

Plasticizers may be used to assist in the formation of shaped articles from those polyesters which exhibit high melting point and/or high values of inherent viscosity.

Fibers: Properties, Heat Treatment, Utility

The as-spun fibers of this invention are characterized by a tenacity within the range of from at least 2 gpd and as high as about 9 gpd, an initial modulus in excess of 200 gpd (and often exceeding 300 gpd), and an X-ray orientation angle of less than about 25°.

The as-spun fibers of this invention may be subjected to heat treatment processes which provide fibers characterized by, e.g., higher levels of tensile properties.

For example, some heat treated fibers of this invention exhibit a tenacity of at least about 10 grams per denier. These properties favor the use of these fibers of this invention in, e.g., belts of automobile tires, towing ropes, plastic reinforcement, knitted and woven fabrics, and other applications wherein a combination of high strength, low extensibility, low density, high initial modulus, and low shrinkage are required, e.g., in the preparation of ropes, hawsers, and cordage for marine usage as noted in U.S. Pat. No. 3,400,194.

In the heat treating process, fiber samples as skeins or on bobbins may be heated in an inert atmosphere (e.g., nitrogen) under a variety of conditions. Heating is normally conducted for from 30 minutes to 4 hours at a temperature approaching the fusion point but sufficiently below to prevent substantial interfilament fusion, i.e., yarns are rewindable. It is preferred that the maximum temperature be reached in a stepwise fashion.

When the fiber samples are wound on bobbins, it is preferred that a soft, yielding surface be present on the bobbin, e.g., a covering of Fiberfrax (batted ceramic insulation of the Carborundum Company). The inert atmosphere within the oven or other heat-treating chamber is changed during the treating period by causing a flow of the inert gas (e.g., nitrogen) to enter and to leave the oven at a rate sufficient to remove by-products from the vicinity of the fiber.

MEASUREMENTS AND TESTS

X-ray Orientation Angle: The orientation angle (O.A.) values reported herein are obtained by the procedures described in Kwolek U.S. Pat. No. 3,671,542, using Method Two of that patent. Shown parenthetically after each O.A. value in the examples is the position, 2θ(degrees), of the specific arc used to determine the O.A. value.

Inherent Viscosity: Inherent viscosity ($\eta$inh) is defined by the following equation:

$$\eta\text{inh} = \frac{\ln(\eta\text{rel})}{C}$$

wherein ($\eta$rel) represents the relative viscosity and C represents a concentration of 0.5 gram of the polymer in 100 ml of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by (C), above; flow times are determined at 30° C; the solvent is sym-dichlorotetrafluoroacetone hydrate.

Fiber Tensile Properties: Filament and yarn properties are measured by the procedures shown in Morgan U.S. Pat. No. 3,827,998. Tenacity, T, and Modulus, Mi, are given in grams per denier. Elongation, E, is given in percent. At least three breaks are averaged.

It should be noted that different values are obtained from single filaments (filament properties) and from multifilament strands (yarn properties) of the same sample. Unless specified otherwise all properties given herein are filament properties.

Optical Anisotropy: Optical anisotropy may be measured by the TOT method described herein.

Spin Stretch Factor: The spin stretch factor is defined as follows:

$$\text{S.S.F.} = \frac{\text{Velocity of yarn at wind-up (ft/min)}}{\text{Velocity of melt through spinneret (ft/min)}}$$

where $$\text{Vel. of melt through spinneret} = \frac{\text{Rate of extrusion (cu ft/min)}}{\text{No. of spinneret holes} \times \text{cross-sectional area of one hole (sq ft)}}$$

TOT AND FLOW TEMPERATURE APPARATUS AND METHOD

The thermo-optical test (TOT) requires a polarizing microscope which should have strain-free optics and sufficiently high extinction with crossed (90°) polarizers to be capable of giving a background transmission specified below. A Leitz Dialux-Pol microscope was used for the determinations reported herein. It was equipped with Polaroid polarizers, binocular eyepieces, and a heating stage. A photodetector (a photometer sensor) was attached at the top of the microscope barrel. The microscope had a 32X, long working distance objective, and a Red I plate (used only when making visual observations with crossed polarizers; inserted at an angle of 45° to each polarizer). White light from an incandescent light source is directed through the polarizer, through the sample on the heating stage and through the analyzer to either the photodetector or the eyepieces. A slide permits transferring the image from eyepieces to photodetector. The heating stage used is one capable of being heated to 500° C. A "Unitron" model MHS vacuum heating stage (Unitron Instrument Co., 66 Needham St., Newton Highlands, Mass. 02161) was used. The photodetector signal is amplified by a photometer amplifier and fed to the Y-axis of an X–Y recorder. The system response to light intensity should be linear and the error of measurement within ± 1 mm. on the chart paper. The heating stage is provided with two attached thermocouples. One is connected to the X-axis of the X–Y recorder to record stage temperature, the other to a programmed temperature controller.

The microscope is focused visually (with crossed polarizers) on a polymer sample prepared and mounted as described below. The sample, but not the cover slip(s), is removed from the optical path. The Polaroid analyzer of the microscope is removed from the optical path, the slide is shifted to transfer the image to the photodetector and the system is adjusted so that full-scale deflection (18 cm on the chart paper used) on the Y-axis of the X–Y recorder corresponds to 36% of the photometer signal. This is done by (1) adjusting the light source intensity so that the photometer meter reads a value preselected so that it corresponds to a Y-axis reading on the recorder of 5 cm; (2) increasing the amplification of the photometer by a factor of 10. This results in the full scale recorder deflection of 18 cm corresponding to (18/50) × 100 or 36% of the photometer signal. The background transmission value is recorded with crossed (90°) polarizers and with the cover slip(s), but not the sample, in the optical path. The background transmission in the system used should be independent of temperature and should be less than about 0.5 cm on the chart paper.

The sample is preferably a 5 μm section microtomed with a diamond knife from a solid well-coalesced chip of pure polymer (e.g., as prepared in the examples, or by melting and coalescing under nitrogen some of the ground polymer) mounted in epoxy resin. For materials that shatter when microtomed, duplicate films (about 5 $\mu$m. thick) of polymer are prepared by heating a few particles of pure polymer between each of two sets of cover slips enclosed between a pair of microscope slides. By heating this assembly quickly above the flow temperature (independently determined on a polymer particle) and applying pressure with a wooden tamp alternately over each sample, thin liquid films of polymer are produced. These films solidify when cooled. One solid film between cover slips is used for the TOT procedure; the other is used for a flow temperature measurement.

The sample section is pressed flat between cover slips. One cover slip is removed and the sample on the remaining cover slip is placed (glass down) on the heating stage. The light intensity is set and the background transmission is measured as described above. The sample (section, or film between cover slips) then is positioned so that essentially all the light intercepted by the photodetector will pass through the sample. With the sample between crossed (90°) polarizers and under nitrogen, the light intensity and temperature are recorded on the X–Y recorder as the temperature is raised at a programmed rate of about 14°C/min. from 25° to 450° C. The sample temperature is obtained from the recorded temperature by use of a suitable calibration curve.

The flow temperature of copolymers or fibers is observed visually between crossed (90°) polarizers on the heating stage assembly previously described for the TOT procedure. Fiber samples for examination are prepared by cutting the fiber with a razor blade and mounting the samples on a cover slip. Flow temperature is that temperature at which the sharp edges of a tiny chip or particle of polymer or the cut fiber edge become rounded. If the melt viscosity is low enough, flow is observed. When a film is used in the TOT procedure, a duplicate film is used for the flow temperature determination. Flow temperature is that temperature at which the film edges change contour or the polymer flows. Observations usually are made at a heating rate of 14° C/min. In a few cases, where rapid further polymerization occurs, a faster rate, about 50° C/min, is recommended.

It should be understood that the flow temperature of these copolymers or fibers thereof may vary depending on their history. For example, stepwise heating ordinarily raises the flow temperature. This permits heat treatment at temperatures above the initial flow temperature but below the newly attained flow temperature level. The reported flow temperatures are those determined by these procedures.

Intensity Traces

The melt-forming copolymers useful for fibers in this invention are considered to form anisotropic melts according to the thermooptical test (TOT) if, as a sample is heated between crossed (90°) polarizers to temperatures above its flow temperature, the intensity of the light transmitted through the resulting anisotropic melt gives a trace whose height (1) is at least twice the height of the background transmission trace on the recorder chart and is at least 0.5 cm greater than the background transmission trace, or (2) increases to such values. Curve B of the FIGURE illustrates a type of intensity trace usually obtained for systems forming anisotropic melts.

The intensity of light transmitted through the analyzer when isotropic melts (the sample should be completely melted) are placed between crossed (90°) polarizers is essentially that of the background transmission (that obtained when the sample but not the cover slip is outside the field of view with 90° crossed polarizers). As the melt forms, the intensity of the light transmission (1) is essentially that of the background transmission or (2) decreases to such values from a higher value. Curve A of the FIGURE illustrates an intensity trace of a polymer forming an isotropic melt.

EXAMPLE 1

This example illustrates preparation of copoly(-chloro-1,4-phenylene ethylenedioxy-4,4'-dibenzoate/-terephthalate; 20/80, mole basis), from which strong fibers are spun.

In a 250 ml round bottom flask equipped with a stirrer, distilling head, and argon bleed are combined chlorohydroquinone diacetate (13.7 g, 0.06 mole), terephthalic acid (8.0 g, 0.048 mole), and ethylenedioxy-4,4'-dibenzoic acid (3.6 g, 0.012 mole). These ingredients, under argon, are heated and stirred between 295°–321° C for 1 hr 35 min; the reaction mixture is solid at the end of this period. The reaction temperature is then raised to within the range of 330°–335° C for about ½ hr, while the softened product is stirred; the by-product acetic acid is collected during these heating periods. The argon flow is halted and the reaction mixture heated within 332°–335° C for about 33 min under a reduced pressure of about 0.20 mm Hg. The product is collected, ground in a Wiley mill, washed with acetone, and dried in vacuo at 80° C to yield 10.3 g of copolymer. The copolymer is insoluble in the inherent viscosity test. The copolymer flows at 325° C and exhibits optical anisotropy above that temperature (TOT).

The copolymer is passed through a spinneret pack and melt-spun through a 1-hole (0.023 cm diam) spinneret, and wound up at speeds up to 503 m/min to yield a filament with T/E/Mi/Den. = 3.6/1.1/392/19.0; O.A. = 13° (18.0°). For this spin, the melt zone and spinneret temperatures are in the range of 330° to 334° C.

A yarn is prepared by plying 8–10 filaments of the as-spun fiber. A skein of this yarn, under slight tension, is placed in an oven swept with a slowly flowing stream of hot nitrogen and is heated under these conditions: from 30° to 280° C over a 2 hr/18 min period, then at 280° C for 4 hrs. The treated fiber exhibits the following filament properties: T/E/Mi/Den. = 10.1/3.3/381/25.

EXAMPLE 2

This example illustrates the preparation of copoly(-chloro-1,4-phenylene ethylenedioxy-4,4'-dibenzoate/-terephthalate; 30/70, mole basis), and fibers thereof.

In an apparatus as described in Example 1 are combined chlorohydroquinone diacetate (95–97% pure; contains dichlorohydroquinone diacetate isomers) (13.7 g, 0.06 mole), ethylenedioxy-4,4'-dibenzoic acid (5.4 g, 0.018 mole), and terephthalic acid (7.0 g, 0.042 mole). These reactants, under argon, are stirred and heated between 303°–320° C for 66 min; the by-product acetic acid is collected. After the argon flow is halted, the reaction mixture is heated within 315°–325° C for 1 hr under a reduced pressure within the range of 0.10–0.50 mm Hg. The copolymer is treated as in Example 1 to yield 13.7 g, of copolymer. The polymer is insoluble in the inherent viscosity test and has a flow temperature equal to 299° C, above which the copolymer exhibits optical anisotropy (TOT).

The copolymer is spun as in Example 1 (melt zone temperature = 292° C, spinneret temperature = 318° C) and wound up at 413 m/min to yield a filament with T/E/Mi/Den. = 7.7/2.5/433/7.7; O.A. = 19° (18.8°). A four-ply yarn is prepared and wound onto a Fiberfrax (batted ceramic insulation of the Carborundum Co.) — Covered perforated steel bobbin and is heated, under nitrogen flow, in an oven under these successive conditions: room temperature – 155° C/0.5 hr, 155°–175° C/1.0 hr, 175°–220° C/2.0 hr, and 220°–280° C/2.0 hr; the oven is allowed to cool to 150° C whereupon the bobbin is removed, examined, and a sample (A) taken, and the bobbin replaced in the oven and heated from 70°–280° C in one hr and at 280° C for an additional hour (sample B). Sample (A) exhibits filament T/E/Mi/ = 13/5.2/306; Sample (B) exhibits T 32 18.

EXAMPLE 3

This example illustrates the preparation of copoly(chloro-1,4-phenylene ethylenedioxy-4,4'-dibenzoate/terephthalate; 50/50, mole basis). Fibers are prepared from the melt of this copolymer.

In an apparatus as described in Example 1 are combined chlorohydroquinone diacetate (13.7 g., 0.06 mole), ethylenedioxy-4,4'-dibenzoic acid (9.1 g., 0.03 mole), and terephthalic acid (5.0 g., 0.03 mole). These reactants, under argon, are stirred and heated between 300°–320° C. for 67 minutes; the by-product acetic acid is collected. The argon flow is halted and the reaction mixture is heated at 318° C. for 1 hr. under reduced pressure within the range of 0.10–0.15 mm. Hg. The copolymer is treated as in Example 1 (drying temperature is 60° C) to yield 16.9 g of copolymer that is insoluble in the inherent viscosity test. The copolymer flows at 243° C and exhibits optical anisotropy above that temperature (TOT).

The copolymer is spun as in Example 1 (melt zone temperature = 238° C., spinneret temperature = 277° C.) and wound up at 700 m./min. to yield a filament with T/E/Mi/Den. = 4.1/1.3/414/4.3; O.A. = 22° (18.9°). Four filaments are plied to give a yarn of about 17 denier. The yarn is heated as in Example 2 under these conditions: room temperature – 150° C./0.5 hr., 150°–170° C./1.0 hr., 170°–220° C./2.0 hr., and 220°–230° C./4.0 hr. The treated yarn exhibits filament T/E/Mi/Den. = 6.2/2.1/387/3.3.

EXAMPLE 4

This example illustrates the preparation of copoly(chloro-1,4-phenylene ethylenedioxy-4,4'-dibenzoate/terephthalate; 70/30, mole basis). Fibers are prepared from the anisotropic melt of this copolymer.

In an apparatus as described in Example 1 are combined chlorohydroquinone diacetate (13.7 g., 0.06 mole), ethylenedioxy-4,4'-dibenzoic acid (12.7 g., 0.042), and terephthalic acid (3.0 g., 0.018 mole). These reactants, under argon, are stirred and heated between 310°–320° C. for 70 min.; the by-product acetic acid is collected.

The argon flow is halted and the reaction mixture is heated between 318°–320° C. for 1 hr. under reduced pressure within the range of 0.10–0.30 mm. Hg. The copolymer is treated as in Example 1 to yield 19.2 g. of copolymer, $\eta$inh = 1.2, flow temperature = 256° C., above which the copolymer exhibits optical anisotropy (TOT).

The copolymer is spun as in Example 1 (melt zone temperature = 256° C., spinneret temperature = 312° C.) and wound up at 735 m./min. to yield a filament with T/E/Mi/Den. = 4.6/1.7/373/4.4; O.A. = 21° (19.1°). Four filaments are plied to give a yarn of about 17 denier. After the yarn is heated as in Example 3, the fiber T/E/Mi/Den. = 5.2/1.8/368/4.3.

EXAMPLE 5

This example illustrates the preparation of copoly(chloro-1,4-phenylene ethylenedioxy-4,4'-dibenzoate/4,4'-bibenzoate; 50/50, mole basis), plus an anisotropic melt and fibers thereof.

In an apparatus as described in Example 1 are combined chlorohydroquinone diacetate (13.7 g., 0.06 mole), ethylenedioxy-4,4'-dibenzoic acid (9.1 g., 0.03 mole), and 4,4'-bibenzoic acid (7.3 g.; 0.03 mole). These reactants, under argon, are stirred and heated between 305°–343° C. for about 65 min.; the by-product acetic acid is collected. The argon flow is halted and the reaction mixture is heated at 342° C. for 1 hr. under reduced pressure within the range of 0.2–1.5 mm Hg. The copolymer is treated as in Example 1 to yield 14.9 g of copolymer insoluble in the inherent viscosity test. The copolymer flow temperature is 253° C, above which the copolymer exhibits optical anisotropy (TOT).

The copolymer is spun as in Example 1 (melt and spinneret temperature = 266° C) and wound up at 137 m/min to yield a filament with T/E/Mi/Den. = 4.4/2.1/321/16.4; O.A. = 24° (18.8°). Four filaments are plied to give a yarn of about 65 denier. After the yarn is heated as in Example 3, it exhibits T/E/Mi/Den. = 4.9/2.3/231/58 (some filament fusion).

EXAMPLE 6

This example illustrates the preparation of copoly(1,4-phenylene/chloro-1,4-phenylene ethylenedioxy-4,4'-dibenzoate/terephthalate; 50/50–50/50, mole basis). This copolymer forms an anisotropic melt and strong fibers.

In an apparatus as described in Example 1 are combined hydroquinone diacetate (5.8 g., 0.03 mole), chlorohydroquinone diacetate (6.8 g., 0.03 mole), ethylenedioxy-4,4'-dibenzoic acid (9.1 g., 0.03 mole), and terephthalic acid (5.0 g., 0.03 mole). These reactants, under argon, are stirred and heated between 309°–324° C. for 70 min.; the by-product acetic acid is collected. After the argon flow is halted, the reaction mixture is heated within 318°–324° C. for 1 hr. under a reduced pressure of about 0.10 mm. Hg. The product is treated as in Example 3 to yield 15.2 g of copolymer that is insoluble in the inherent viscosity test. The copolymer flows at 286° C and exhibits optical anisotropy above that temperature (TOT).

The copolymer is spun as in Example 1 (melt zone temperature = 308° C., spinneret temperature = 340° C.) and wound up at 579 m./min. to yield a filament with T/E/Mi/Den. = 5.5/2.2/357/4.8; O.A. = 15° (19.5°). A four-ply yarn is prepared and heat treated as in Example 2 (sample B) to yield a product with filament T/E/Mi/Den. = 11.0/3.7/398/5.3.

EXAMPLE 7

This example illustrates the preparation of copoly(chloro-1,4-phenylene ethylenedioxy-4,4'-dibenzoate/- hexahydroterephthalate; 50/50, mole basis), and fibers thereof.

In an apparatus as described in Example 1 are combined chlorohydroquinone diacetate (13.7 g., 0.06 mole), ethylenedioxy-4,4'-dibenzoic acid (9.1 g., 0.03 mole), and hexahydroterephthalic acid (100% trans-isomer, 5.2 g., 0.03 mole). These reactants, under argon, are stirred and heated between 310°–335° C. for 68 min.; the by-product acetic acid is collected. The argon flow is halted and the reaction mixture is heated at 322° C. for 64 min. under reduced pressure (<1 mm. Hg). The copolymer is treated as in Example 3 (washed 2X with acetone) to yield 16.8 g. of copolymer, $\eta$inh = 1.63. The copolymer flows at 213° C. and exhibits optical anisotropy above that temperature (TOT).

The copolymer is spun as in Example 1 (melt zone temperature = 260° C., spinneret temperature = 285° C.) and wound up at 238 m./min. to yield a filament with T/E/Mi/Den. = 3.7/2.2/240/11.4; O.A. = 24° (18.7°). Filaments are plied and the yarn heated as in Example 1 under these conditions: from 25°–198° C. over a 33 min. period, then at 200° C. for 4 hrs. For this fiber, filament T/E/Mi/Den. = 4.5/2.7/238/12.

What is claimed is:

1. A fiber-forming melt spinnable copolyester capable of forming an anisotropic melt and consisting essentially of units of the formula:

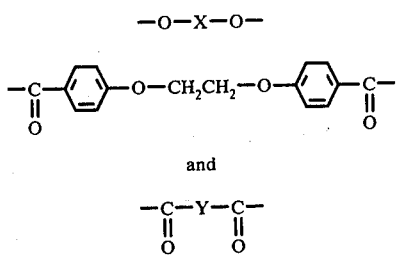

wherein X represents a member selected from the group consisting of chloro-, bromo-, methyl- and dimethyl-1,4-phenylene radicals; up to 80 mol % of formula I units may be replaced with

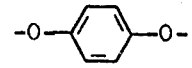

units; Y is selected from the group of 1,4-phenylene, 1,4-cyclohexylene, 4,4'-biphenylene, and 2,6-naphthylene radicals; and the mol ratio of formula II to formula III units is from 1:4 to 4:1.

2. Poly(chloro-1,4-phenylene ethylenedioxy-4,4'-dibenzoate/terephthalate)(30/70) according to claim 1.

3. An anisotropic melt of the copolyester of claim 1.
4. A shaped article of the copolyester of claim 1.
5. A fiber of the copolyester of claim 1.
6. An as-spun fiber of the copolyester of claim 1 having a tenacity of at least 2 gpd, an initial modulus in excess of 200 gpd and an X-ray orientation angle of less than about 25°.
7. Copoly(chloro-1,4-phenylene ethylenedioxy-4,4'-dibenzoate/4,4'-bibenzoate)(50/50) according to claim 1.
8. Copoly(1,4-phenylene/chloro-1,4-phenylene ethylenedioxy-4,4'-dibenzoate/terephthalate)(50/-50–50/50) according to claim 1.
9. Copoly(chloro-1,4-phenylene ethylenedioxy-4,4'-dibenzoate/hexahydroterephthalate)(50/50) according to claim 1.
10. A film of the copolyester of claim 1.
11. The polymer of claim 1 wherein X is chloro-1,4-phenylene and Y is 1,4-phenylene.

* * * * *